United States Patent [19]

Kosuge

[11] 4,090,194
[45] May 16, 1978

[54] INDICATION APPARATUS
[75] Inventor: Shuichi Kosuge, Nagoya, Japan
[73] Assignee: Nippondenso Co., Ltd., Kariya, Japan
[21] Appl. No.: 772,278
[22] Filed: Feb. 25, 1977
[30] Foreign Application Priority Data
  Mar. 10, 1976  Japan .................................. 51-26265
  Mar. 12, 1976  Japan .................................. 51-27394
[51] Int. Cl.² ............................................ G08B 19/00
[52] U.S. Cl. .................................. 340/414; 340/52 F;
  340/223; 340/324 R; 340/379
[58] Field of Search .................. 340/27 R, 52 F, 197,
  340/223, 324 R, 325, 379, 412, 414, 415

[56] References Cited
U.S. PATENT DOCUMENTS

| | | | |
|---|---|---|---|
| 3,665,383 | 5/1972 | Fales | 340/52 F |
| 3,835,450 | 9/1974 | Reck | 340/52 F |
| 3,839,701 | 10/1974 | Pomerantz | 340/52 F |
| 3,987,439 | 10/1976 | Spaniola | 340/413 |

Primary Examiner—Alvin H. Waring
Attorney, Agent, or Firm—Cushman, Darby & Cushman

[57] ABSTRACT

An indication apparatus indicates a highest priority one of a plurality of simultaneously occurring abnormal states of a vehicle. When one of a plurality of abnormal state sensors is opened, a drive motor coupled to an indication drum starts to rotate and stops when a position on the indication drum indicating above abnormal state sensor is reached. When another sensor having higher priority than the first sensor is also opened, the indication drum rotates to the position corresponding to the second higher priority sensor, but when a sensor having a lower priority is further opened the indication drum remains fixed at the position corresponding to the first sensor.

3 Claims, 3 Drawing Figures

INDICATION APPARATUS

BACKGROUND OF THE INVENTION

The present invention relates to an indication apparatus having a rotary indication drum bearing characters or symbols on its outer periphery and capable of indicating a highest priority one of a plurality of simultaneously occurring indication items.

Heretofore, in order to impart the priority to the indication items, a logic is incorporated in a motor drive circuit such that the indication drum is rotated until an indicium corresponding to the highest priority item coincides with an indicium corresponding to the indication item on the indication drum.

However, this method includes a drawback in that as the number of indication items increases a priority logic circuit becomes more and more complex, and a coding circuit as well as a discrimination circuit for determining the coincidence of the code also becomes complex.

SUMMARY OF THE INVENTION

It is an object of the present invention to eliminate the above difficulty and provide an indication apparatus which facilitates the simplification of a circuit for determining the priority of sensor outputs.

DESCRIPTION OF THE PREFERRED EMBODIMENTS

The present invention will now be described in detail in conjunction with the first embodiment of the invention.

Figure 1:
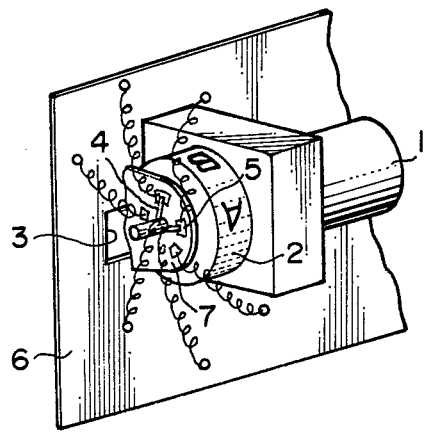
FIG. 1 is a perspective view showing a mechanical functional section of an indication apparatus of the present invention.

FIG. 1 shows a mechanical functional section of an indication apparatus, in which numeral 1 denotes a d.c. electric motor, 2 an indication drum driven by the d.c. motor 1 and having necessary indication items marked on its outer peripheral surface, 3 a window formed in an indication panel 6 for the indication of the indication items, 4 a pair of brushes serving as movable contacts attached on the drive shaft of the drum 2 and spaced from each other by a distance corresponding to one frame of the indication item on the indication drum. Numeral 5 denotes stationary contacts fixed to a stationary plate 7, the stationary contacts 5 which correspond in number to the number of the indication items being circumferentially disposed to allow each contact to be contacted with the movable contacts 4.

Figure 2:
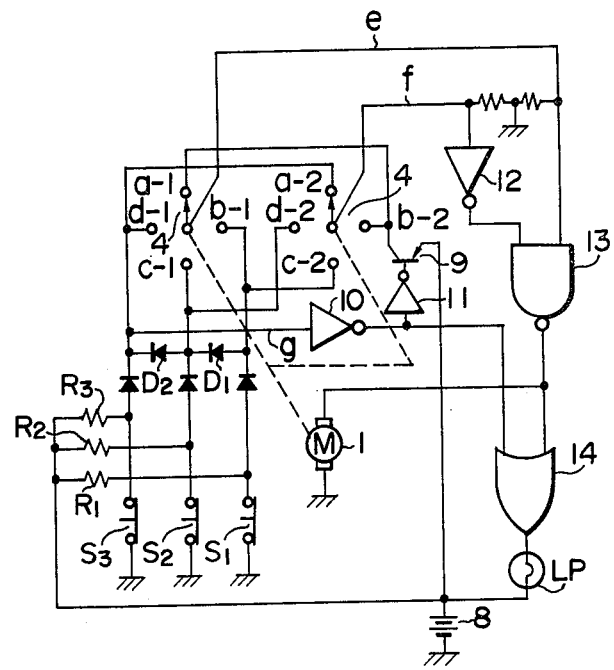
FIG. 2 is an electrical wiring diagram showing a control circuit in a first embodiment of the present invention.

FIG. 2 shows a control circuit for indicating detection signals in their priority order. S1, S2 and S3 denote switches of normaly closed sensor type which, in the case of an automobile, for example, detect abnormal states such as insufficiencies of engine oil, gasoline quantity, the air pressure of a tire or the like. The switches S1, S2 and S3 have the priority in this order R1, R2 and R3 denote resistors, each one end of which is commonly connected to a d.c. power supply 8 while each of the other ends of which are connected to the switches S1, S2 and S3. D1 and D2 denote diodes to decide the priority of the switches S1, S2 and S3. Numeral 9 denotes a transistor, a collector of which is connected to contacts $a$-1 and $b$-2 of a switch other than the switches S1 to S3 corresponding to the indication items. Numerals 10, 11 and 12 denote inverter gates, 13 denotes a NAND gate, 14 denotes an OR gate and LP denotes an illumination lamp mounted within the indication drum 2 to illuminate the indication items marked on the indication drum 2. Input signals from the switches S1 to S3 are selected by the switch having movable contacts 4 and stationary contacts 5 ($a$-1, $b$-1, $c$-1, $d$-1 and $a$-2, $b$-2, $c$-2, $d$-2), and the selected signal is applied through signal lines $e$ and $f$ to a discrimination circuit. In response to the discrimination output, the motor 1 is driven, which in turn drives the movable contacts 4 and the drum 2 in a linked manner. When the desired indication item appears through the indication window 3 to be visually observed, the drum 2 is stopped and the illumination lamp LP within the indication drum 2 is turned on.

The operation of the above arrangement is explained below. As is apparent from the drawing, the motor 1 is stopped only when the lines $e$ and $f$ are at a high level and a low level, respectively, whereas it is kept rotating during other signal conditions. On the other hand, the lamp LP is turned on only when the line $g$ is at high level and the motor 1 is in the stop state. When all of the switches S1 to S3 are closed, then the line $g$ is at low level, the transistor 9 is turned on, the stationary contacts $a$-1 and $b$-2 are kept at high level while all of the other contacts $b$-1, $c$-1, $d$-1, $a$-2, $c$-2 and $d$-2 are kept at low level. Therefore, when the brush 4 contacts the contact $a$-1, as shown in FIG. 2 the lines $e$ and $f$ are at high level and low level, respectively. Thus, the drum 2 rotates to the position corresponding to the contact $a$-1 and then stops so that the indicium corresponding to the contact $a$-1 may be observed through the window 3. In this state, when the switch S2 is opened, the potential of the line $g$ becomes high level because of the diode D2 and the transistor 9 is turned off. As a result, the line $e$ becomes low level and the motor 1 starts to rotate the drum 2. The brush 4 is then rotated together with the drum 2. At this time, the contacts $c$-1, $d$-1, $d$-2 and $a$-2 are kept at high level and the remaining contacts $a$-1, $b$-1, $b$-2 and $c$-2 are kept at low level. When the brush or movable contact 4 comes to contact with the contact $c$-1 connected to the switch S2, the lines $e$ and $f$ becomes high level and low level, respectively, and the drum 2 is stopped so that the indicium corresponding to the contact $c$-1 may be observed through the window 3. Under this condition, even if the switch S3 is opened the drum 2 maintains the position in which the movable contact 4 contacts with the contact $c$-1 because no change of level at the contacts of the switch take place. This results from the priority of the switch S2 over the switch S3. If the switch S1 having the priority over the switch S2 is then opened, the contact $c$-2 becomes high level and the motor 1 initiates to rotate the drum 2 and the brush 4. When the brush 4 comes to contact with the contact $b$-1 connected to the switch S1, the lines $e$ and $f$ are at high level and low level, respectively, and the rotation of the drum 2 is stopped so that the indicium corresponding to the contact $b$-1 may be observed through the window 3.

In the present embodiment, the indication drum 2 marked with characters or symbols on its outer peripheral surface is so rotated to a predetermined position as that the indication item represented by the opening of the switches S1 to S3 is recognized through the indication window 3. In order to control the rotation and stop of the drum 2, the logic signal on the line e is so derived from the first movable contact 4 which scans the stationary contacts (a-1, b-1, c-1, d-1) as that it becomes high level when the contacts corresponding to the item to be indicated and the items of lower priority than the item to be indicated are contacted and that it becomes low level when the contacts corresponding to the items of higher priority are contacted, and the logic signal on the line f is derived from the second movable contact 4 which scans the stationary contacts (a-2, b-2, c-2, d-2) as that it becomes high level when the contacts corresponding to the items of lower priority than the item to be indicated are contacted and that it becomes low level when the contacts corresponding to the item to be indicated and the items of higher priority are contacted.

The drum 2 is so adapted as to be stopped only when the signals e and f are at high level and low level, respectively and to be rotated during other conditions.

While three indication items corresponding to three switches S1 to S3 are illustrated in the above embodiment, a larger number of indication items can be indicated by additionally providing the switches similar to S1, S2, S3, the stationary contacts similar to 5 and the diodes similar to D1, D2.

Figure 3:
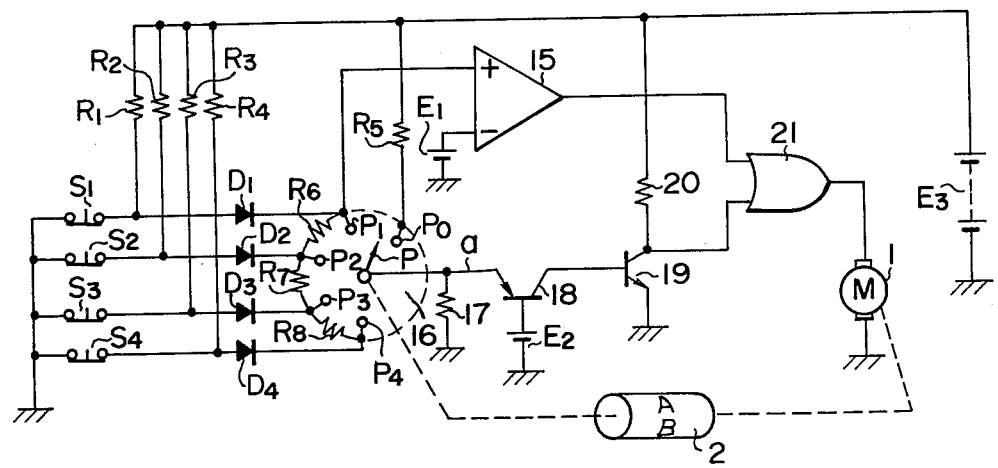
FIG. 3 is an electrical wiring diagram showing a control circuit in a second embodiment of the present invention.

A second embodiment of the present invention will now be described. FIG. 3 shows a second embodiment in which four signal lines are provided and an indication drum is stopped at a position corresponding to the abnormal detection signal having the highest priority. S1, S2, S3 and S4 denote switches which may be normaly closed sensors for detecting abnormal states. R1, R2, R3 and R4 denote pull-up resistors each one end of which is commonly connected to a d.c. power supply E3, and at each other end of which high level signals appear when the switches S1 to S4 are opened. The priority is imparted in the order of S1, S2, S3, S4 by varying the resistance value of the resistors R1 to R4. R5 denotes a resistor having one end connected to the d.c. power supply E3, and R6, R7 and R8 denote resistors connected between the respective switches S1 to S4 and the respective signal lines. A voltage comparator 15 having a reference input potential E1 is connected to the signal line leading to the highest priority switch S1. D1, D2, D3 and D4 denote diodes, and numeral 16 denotes a rotary switch having a movable contact P and stationary contacts P0, P1, P2, P3 and P4. The movable contact P is linked with an indication drum 2 to be rotated thereby. The drum 2 is coupled to a motor 1 in the same manner as in the first embodiment to scan the stationary contacts P0 to P4 in sequence. The stationary contacts P1 to P4 are connected to the signal lines leading to the switches S1 to S4, respectively, and the stationary contact P0 is connected to the d.c. power supply E3 through the resistor R5. Numeral 17 denotes a resistor for dividing, together with the resistors R6, R7, R8, a voltage appearing on the signal line, and numeral 18 denotes a transistor a base of which is supplied with a reference potential E2 so that when an emitter potential at point a exceeds a sum of the reference potential E2 and a base-emitter voltage of the transistor 18, the transistor 18 is turned on to maintain the potential at the point a at said potential. A transistor 19 and a resistor 20 constitute an inverter an output of which together with the output of the voltage comparator 15 is applied to an OR gate 21 such that when at least one of said outputs becomes high level the OR gate 21 actuates the motor 1. The motor 1 may be a d.c. motor or a pulse motor with an oscillation circuit, and the indication drum 2 driven by the motor 1 has a plurality of indication items (five items in the illustrated embodiment) marked on its outer peripheral surface. The respective indication items are positioned to correspond to the stationary contacts P0 to P4 of the rotary switch 16. The stationary contact P0 corresponds to a subject item and the stationary contacts P1 to P4 correspond to detection items.

The operation of the above arrangement is described below. When all of the switches S1 to S4 are closed and the movable contact P is at the position of the stationary contact P0, an emitter current flows through the resistor R5 to the transistor 18 causing it to turn on and hence the transistor 19 to turn on resulting in the generation of low level signal at the collector of the transistor 19. Since the output of the voltage comparator 15 is also at low level, the OR gate 21 produces a low level output so that the motor 1 is stopped and the movable contact P remains stopped at the position of the stationary contact P0. When the switch S3 is then opened, a high level input is applied to the voltage comparator 15 through the resistors R3, R7, R6, and the OR gate 21 produce a high level output to actuate the motor 1. Then, as the movable contact 2 which rotates in synchronism with the motor 1 scans the stationary contact P1 and P2 before it reaches the stationary contact P3 corresponding to the switch S3 now being opened. The input voltage to the voltage comparator 15 is divided by the resistors R6, R7 and 17 before the movable contact P contacts with the stationary contact P3 so that it is reduced below the reference potential E1. As a result the output of the voltage comparator 15 is at a low level. In this case, however, since the potential at the point a is reduced below the reference potential E2 by the voltage division and the transistors 18 and 19 are turned off resulting in a high level output at the collector of the transistor 19, the OR gate 21 produces the high level output and the motor 1 continues to rotate. Then, when the movable contact P reaches the position of the stationary contact P3, the point a becomes high level and an emitter current flows in the transistor 18 so that the potential at the point a is fixed to the reference potential E2. As a result, the input voltage to the voltage comparator 15 becomes lower than the reference potential E1 and the voltage comparator 15 produces a low level output. On the other hand, the transistors 18 and 19 are turned on resulting in a low level output at the collector of the transistor 19. As a result, the OR gate 21 produces a low level output and the motor 1 is finally stopped at the position where the movable contact P contacts with the stationary contact P3. In this manner, the indication item of the switch S3 corresponding to the contact P3 can be indicated.

Under this condition, if the switch S4 having the priority lower than that of the switch S3 is opened, a signal from the switch S4 is additionally applied to the contact P3 through the diode D4 and the resistor R8, but since the potential at the point a is fixed to the reference potential E2 by the conduction of the transistor 18, the output of the voltage comparator 15 and the collector output of the transistor 19 remain at low level and the movable contact P remains stopped at the previous position.

If the switch S1 or S2 having the priority higher than that of the switch S3 is opened when the switch S3 is still in its open state, the input voltage to the voltage comparator 15 rises higher than the reference potential E1 so that the output of the voltage comparator 15 becomes high level to start the rotation of the motor 1 and the movable contact P which has been contacted with the contact P3 is rotated to the contact P1 now opened. In this manner, the indication drum 2 indicates the indication item corresponding to the higher priority switch S1.

As described above, in the present embodiment, a plurality of signal lines with the priority being assigned are connected with the resistors R6, R7 and R8 and the signal line of the highest priority is connected to the input of the voltage comparator 15 in which it is compared with the predetermined potential E1. The comparison resulting output is ORed with the signal derived from the circuit which functions as the sink constant voltage circuit when the signal from the signal line selected by the rotary switch 16 linked to the indication drum 2 which is a mechanical element exceeds the predetermined voltage, to stop the rotation of the motor 1 which constitutes a drive means for the succeeding stage. In this manner, even when a plurality of switches are opened concurrently, the stop position of the indication drum 2 can be controlled in accordance with the priority.

While the d.c. motor is used as the drive means in the above embodiment, a solenoid coil or a pulse motor may be used. In this case, a similar effect may be obtained by on-off controlling a drive circuit therefor such as an oscillation circuit by the output of the OR gate 21 shown in the above embodiment.

I claim:
1. An indication apparatus comprising:
   an indication drum having a plurality of indicia thereon;
   a plurality of stationary contacts positioned circularly to correspond to respective indicia on said indication drum;
   a first movable contact coupled to be rotated in synchronized relationship with said indication drum for contacting one of said stationary contacts when one of said indicia is positioned at a predetermined position due to rotation of said indication drum;
   a second movable contact coupled to be rotated in synchronized relationship with said indication drum for contacting another of said stationary contacts when said first movable contact contacts with said one of said stationary contacts;
   a plurality of sensors connected to said respective stationary contacts for sensing the abnormal state of respective items corresponding to said indicia and applying an output signal to the corresponding stationary contact;
   priority means for applying said output signal to the stationary contact corresponding to the item having either higher or lower priority over the item sensed to be abnormal; and
   a logic circuit connected to control the rotation of said indication drum in accordance with two input signals applied through said first and second movable contacts, said logic circuit rotating said indication drum so that the item sensed to be abnormal is indicated at said predetermined position and that another item sensed to be abnormal is indicated at said predetermined position when the latter item has higher priority over the former item.

2. An indication apparatus according to claim 1, wherein said priority means includes a diode connected between two contacts among said stationary contacts, said two contacts being corresponding to respective items having different priority from each other.

3. An indication apparatus according to claim 2 further comprising:
   an electric motor coupled to be energized by said logic circuit and rotate said indication drum; and
   a lamp coupled to be energized when said electric motor is de-energized for illuminating the indicium at said predetermined position.

* * * * *